July 14, 1925.  
J. STRZYCZKOWSKI  
AUTOMOBILE TIRE  
Filed Sept. 29, 1923

INVENTOR  
JULIAN STRZYCZKOWSKI  
BY  
ATTORNEYS

July 14, 1925.
J. STRZYCZKOWSKI
1,545,987
AUTOMOBILE TIRE
Filed Sept. 29, 1923  2 Sheets-Sheet 2
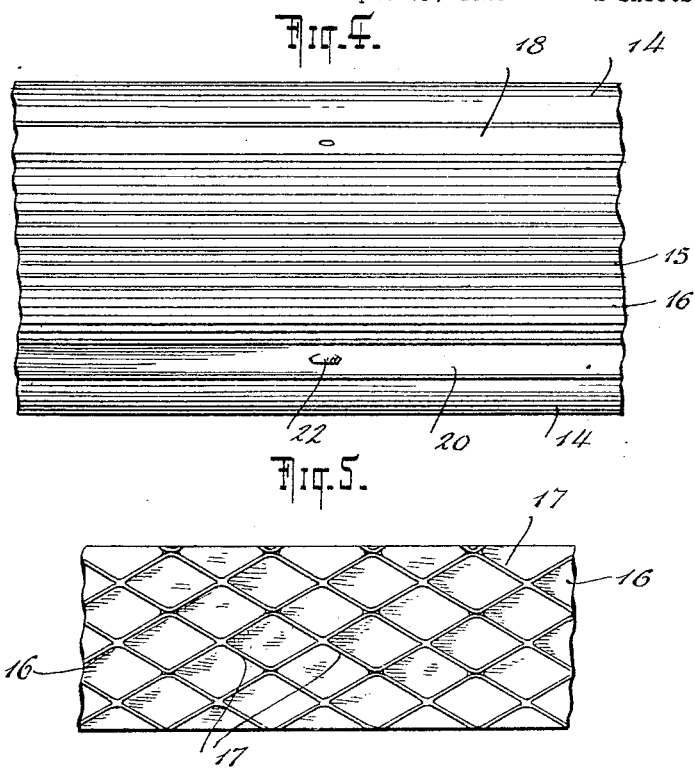
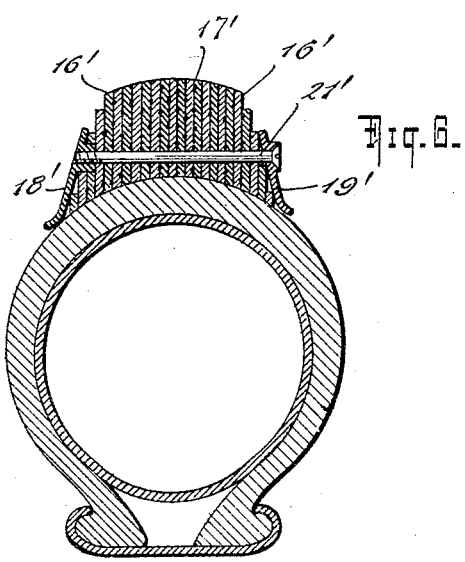
INVENTOR
JULIAN STRZYCZKOWSKI
BY
ATTORNEYS Patented July 14, 1925.

1,545,987

UNITED STATES PATENT OFFICE.

JULIAN STRZYCZKOWSKI, OF NEW YORK, N. Y.

AUTOMOBILE TIRE.

Application filed September 29, 1923. Serial No. 665,548.

*To all whom it may concern:*

Be it known that I, JULIAN STRZYCZKOWSKI, a citizen of the United States, residing at New York, county of New York, and State of New York, have invented certain new and useful Improvements in Automobile Tires, of which the following is a specification.

The principal object of this invention is to provide a new and improved construction in a protective tread adapted to be used as a part of the outer shoe of an inflatable automobile tire.

A further object is to provide a laminated structure consisting of a plurality of sheets of suitable material having a metallic mesh reinforcement arranged between and pressed into the adjacent sheets.

Another object is to provide a simple and inexpensive construction of a protective tread which will effectively safeguard the tire from being punctured, will have a high frictional coefficient to enable the protective tread to exert a sufficient tractive effect, and which will have sufficient resiliency to maintain the easy riding qualities of the inflatable tire while at the same time possessing sufficient resistance to wear to insure longevity of service.

For the accomplishment of these and such further objects as will hereinafter be apparent to those skilled in the art to which this appertains the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification—

Fig. 4 is a plan view of the tread.

Fig. 5 is a section on the line 5—5 of Fig. 3 and

Fig. 6 is a section similar to Fig. 2 showing a modified form of the manner of securing the tread to a tire.

Figure 1:
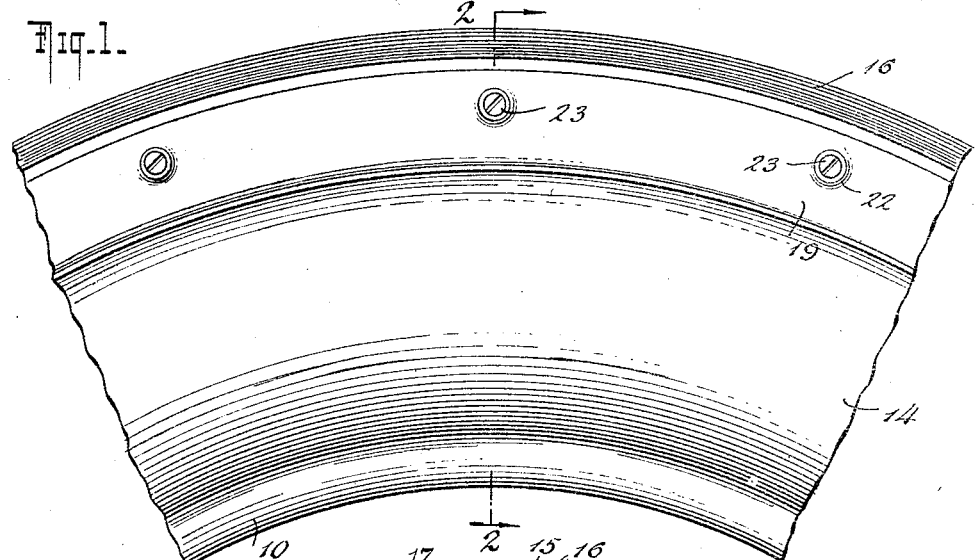
Fig. 1 is a side elevation partly in section of a portion of an inflatable tire embodying a protective tread in accordance with my invention.
Figure 2:
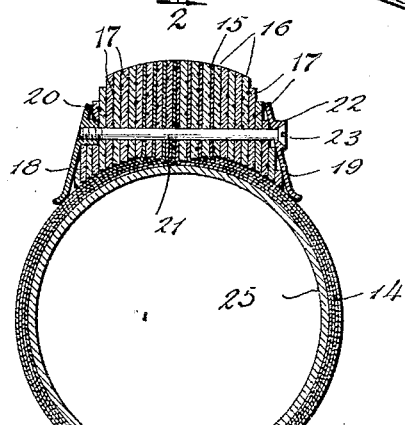
Fig. 2 is a section on the line 2—2 of Fig. 1.
Figure 3:
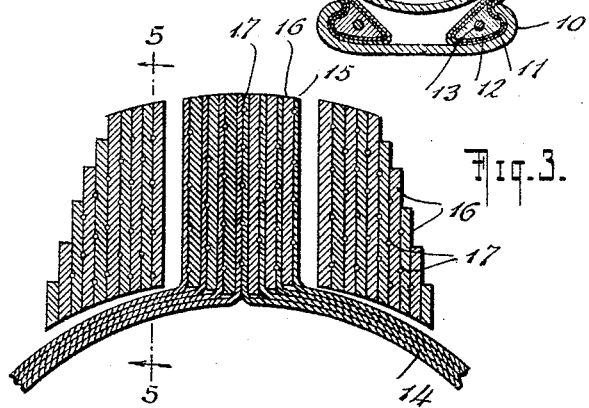
Fig. 3 is an enlarged sectional view similar to Fig. 2 showing the manner in which an outer shoe having my improved tread of laminated construction is assembled.

As shown in Figs. 1 to 5 of the drawings the numeral 10 indicates the wheel rim having its side edges curved up to form a retaining means for the clincher bead of the tire. As shown in Fig. 2 the outer shoe of my improved tire preferably consists of a plurality of sheets 11 of any suitable fabric such as canvas which are wrapped about a rubber bead 12, having a reinforcing wire 13, therein. The fabric sheets 11 are extended to form the side portions 14 of the tire and the free ends of said sheets are extended substantially normal to the outer circumference of the tire as at 15. A plurality of annular sheets 16 are constructed of rubber, fibre, wood, leather, paper, pressed pulp, canvas or any other suitable material having a high frictional coefficient to insure a suitable tractive effect and offering sufficient resistance to wear while possessing a sufficient degree of resiliency to insure a noiseless tread and maintain the easy riding qualities of the inflatable tire. The ends 15 of the fabric sheets 12 are placed between the annular sheets 16 and a metallic open meshed wire structure 17 is interposed between each end 15 and its adjacent annular sheet 16, the sheets 16, ends 15 and wire structure 17 being firmly pressed together to cause the strands of the wire structure to be imbedded into the fabric and annular sheets so as to bind them into a unitary central tread structure. As shown in the drawing the central tread structure consists of eight ends 15, the two central ones being in juxtaposition and having a wire structure 17 therebetween, and six sheets 16 alternating with the remaining six ends 15 and there being a wire structure 17 between each of the remaining six sheets and ends. Obviously the number of ends 15, wire structures 17 and annular sheets 16 used for the central tread unit and the relative arrangement thereof may be varied as desired.

A pair of side tread units are each composed of a plurality of annular sheets 16 similar to those used for the central tread unit and having a metallic structure 17 interposed therebetween. The outer annular sheets 16 of the side tread units are of different heights as shown to provide in effect inclined outer sides on the tread against which the rings 18, 19 of sheet steel or other suitable metal are clamped. Ring 18 is provided on its inner surface with a plurality of threaded bosses 20 in which the threaded ends of screws 21 engage, while the other ring 19 is provided on its outer face with the bosses 22 which are apertured and countersunk to receive the flat heads 23 of said screws. The usual inflatable inner tube 25 is contained within the tire as shown.

In the modification shown in Fig. 6 I have shown a tread constructed as heretofore described of annular sheets 16' and metallic wire structure 17' and designed to be used as an attachment to the common and well known types of outer shoes, a pair of sheet metal rings 18', 19' and screws 21' being provided to hold the laminated tread structure together and to the tire. In this form of the invention the laminated tread structure is preferably constructed of a pair of similar halves or units.

The mesh of the metallic structures 17 and 17' is preferably diamond shape as shown in Fig. 5 and extends to the outer or tread surface. It will therefore be seen that a plurality of wire strands will always be presented at the outer or wearing circumference of the tread, so as to not only insure greater wearing properties to the tread but to also obtain a more efficient tractive effect.

Having thus disclosed my invention, what I claim as new and desire to secure by Letters Patent of the United States, is:

1. A protective tread for tires including a laminated structure consisting of a plurality of annular sheets, a metallic wire structure interposed between the juxtaposed faces of said sheets, a pair of annular rings arranged around the outer side faces of said sheets in outwardly converging relation with respect to each other, and means to clamp said rings and sheets together.

2. A protective tread for tires comprising a laminated structure consisting of a plurality of thin annular sheets of semi-resilient material and a metallic wire structure interposed between the juxtaposed faces of said sheets, a pair of annular rings arranged around the outer side faces of said tread and means to clamp said rings and sheets together, the outer side sheets of said tread being of different widths whereby said rings will be caused to assume an inclined position with respect to said sheets.

3. A protective tread for tires including a plurality of flexible sheets extending from the rim portion of a tire to form the side portions thereof and the edges of said sheets being arranged to form a portion of the tread, a plurality of annular sheets arranged in juxtaposed position with the first named sheets and combining therewith to form the tread of the tire, said annular sheets being interposed between certain of said first named sheets, a metallic wire structure interposed between the juxtaposed faces of said flexible sheets, and a pair of rings on opposite sides of the outermost flexible sheets secured to all of said sheets in outwardly converging relation.

4. An inflatable tire comprising an outer shoe consisting of a plurality of fabric sheets, means interposed between said sheets to form an inner bead portion, said sheets being extended to form the side portions of said tire, and having their outer edges extended substantially normal to the outer circumference of the main portion of said tire, a plurality of annular sheets of semi-resilient material, between which said outer ends are placed and a metallic wire structure interposed between said annular sheets and said outer ends of said fabric sheets, said outer ends, annular sheets and wire structure being pressed together to form a laminated central unit of a tread, a pair of similar laminated side tread units comprising a plurality of annular sheets and wire structures arranged in juxtaposed relation and means to clamp said units together.

5. An inflatable tire comprising an outer shoe consisting of a plurality of fabric sheets, means interposed between said sheets to form an inner bead portion, said sheets being extended to form the side portions of said tire, and having their outer edges extended substantially normal to the outer circumference of the main portion of said tire, a plurality of annular sheets of semi-resilient material, between which said outer ends are placed and a metallic wire structure interposed between said annular sheets and said outer ends of said fabric sheets, said outer ends, annular sheets and wire structure being pressed together to form a laminated central unit of a tread, a pair of similar laminated side tread units comprising a plurality of annular sheets and wire structures arranged in juxtaposed relation and means to clamp said units together comprising a pair of metal rings at the sides of said side tread units and means to clamp said rings and units together.

In testimony whereof I have affixed my signature.

JULIAN STRZYCZKOWSKI.